United States Patent
Papst, deceased et al.

[11] 3,845,786

[45] Nov. 5, 1974

[54] DISC OR PLATE VALVE FOR PISTON-TYPE COMPRESSORS

[75] Inventors: Joseph Papst, deceased, late of Vienna, Austria by Stephanie Papst; Brigitte Brockmuller, nee Papst, Kirkland, Montreal, Canada sole beneficiaries

[73] Assignee: Hoerbiger Ventilwerke Aktiengesellschaft, Vienna XI, Austria

[22] Filed: June 22, 1973

[21] Appl. No.: 372,585

[52] U.S. Cl. ............ 137/535, 137/516.17, 137/531
[51] Int. Cl. ........................................... F16k 15/08
[58] Field of Search ..... 137/516.15, 516.17, 516.19, 137/516.21, 516.23, 512.15, 530, 531, 535; 251/337

[56] References Cited
UNITED STATES PATENTS

| | | | |
|---|---|---|---|
| 1,487,023 | 3/1924 | Riesner | 137/516.23 |
| 1,659,816 | 2/1928 | Halleck | 137/516.19 |
| 3,338,264 | 8/1967 | Dykzeul et al. | 137/531 X |

FOREIGN PATENTS OR APPLICATIONS

| | | | |
|---|---|---|---|
| 788,268 | 12/1957 | Great Britain | 137/516.19 |
| 870,386 | 6/1961 | Great Britain | 137/516.15 |
| 751,330 | 6/1956 | Great Britain | 137/516.21 |
| 778,884 | 7/1957 | Great Britain | 137/516.21 |

*Primary Examiner*—William R. Cline
*Attorney, Agent, or Firm*—Watson, Cole, Grindle & Watson

[57] ABSTRACT

A disc or plate valve for piston-type compressors, having a valve seat, a valve stop spaced from the valve seat, a valve disc or closing member mounted for movement between the valve seat and the valve stop, and a spring plate mounted between the valve disc and the valve stop and having one or more spring tongues for urging the valve disc into sealing engagement with the valve seat, wherein protuberances are provided on the tongues for increasing the resistance thereof when the valve disc is in its partly open position.

6 Claims, 5 Drawing Figures

PATENTED NOV 5 1974  3,845,786

DISC OR PLATE VALVE FOR PISTON-TYPE COMPRESSORS

This invention relates to a disc valve, particularly a suction or pressure valve for piston compressors of which the valve disc is pressed onto the valve seat by deflected tongues of at least one spring plate supported on a valve stop.

As is known, it is the function of the spring plate of the compressor valve to hold the valve disc secure on the valve seat even in a pressureless state and during a reversal of stroke to ensure that the valve is closed at the correct time. Furthermore, the spring plate also damps the impacts of the valve plate on the valve stop. However, in the closing position of the valve the spring plate should exert only a comparatively small closing force on the valve disc so that the latter can be duly raised from the valve seat on opening the valve. In order to achieve effective impact damping, particularly in the case of high-speed compressors wherein considerable impact speeds occur, additional measures are necessary for damping the impacts of the valve disc.

A repeatedly used measure for damping the impacts of the valve disc consists in mounting one or more damping plates which are loaded by special damping springs at a distance in front of the valve stop. Furthermore, it is known to bend out special damping tongues which are supported on the valve stop from the spring plate in addition to the spring tongues deflected against the valve in the direction of the valve stop. The damping tongues which are usually shorter and consequently stiffer than the spring tongues cause a progressive damping of the disc impact. Furthermore, for damping the impact the valve stop is normally provided with a superimposed layer of shock-absorbing material. The measures known hitherto require a considerable expense in construction and are not always satisfactory in their effectiveness. Furthermore, the closing movement of the valve disc is disadvantagesouly delayed by an adhesive effect, particularly occurring in lubricated valves, between the plates which in the open position are superposed over their entire surface.

An object of this invention is to provide effective impact damping for the valve disc at a low structural expense and in extensively avoiding the adhesive effect which delays the closing movement and causes an increase in the impact speed of the valve disc on the valve seat.

According to the invention there is provided a disc valve having a valve seat, a valve stop spaced from the valve seat, a valve disc or closing member mounted for movement between the valve seat and the valve stop, a valve spring mounted between the valve disc and the valve stop and having one or more spring tongues for urging the valve disc into sealing engagement with the valve seat, and means for increasing the resistance of the springs tongues when the valve disc is in its partly open position.

The means for increasing the resistance of the spring tongues may be in the form of protuberances on the surface of the valve stop facing the valve seat, each protuberance being adapted to abut a corresponding spring tongue at a point spaced from the free end of the tongue when the valve is in the partly open position.

During the opening stroke of the valve disc or closing member the resilient tongues of the spring plate meet the protuberances associated therewith shortly before the valve disc reaches the valve stop, whereupon only that part of the tongue lying between the stop and the end of the tongue can be deflected further towards the valve stop. A reduction in the resilient length of the tongues is thereby achieved whereby the latter becomes stiffer and cause a corresponding damping of the impact valve disc. A special damping plate can therefore be dispensed with. The protuberances at the same time prevent the valve plate from abutting the spring plate over its entire surface when the valve is open. The disadvantageous adhesive effect between the plates is thereby substantially eliminated.

The protuberances may be formed integrally of the stop valve or may be fastened thereon, e.g., by welding. The protuberances may be formed by cutting the valve stop surface or by a simple welding or adhesive process. It is however also possible to insert special protuberance members in the valve stop for example in the manner of stoppers.

Alternatively, the disc valve may include a cushion plate mounted between the valve stop and the valve spring and the means for increasing the resistance of the spring tongues may then be in the form of protuberances on the surface of the cushion plate facing the valve seat, each protuberance being adapted to abut a corresponding spring tongue at a point spaced from the free end of the tongue when the valve is in the partly open position. The projections may be pressed or stamped into the cushion plate. Furthermore, discs with, for example, star-shaped projections forming the protuberances may also be built-in in front of the valve stop.

The stops may be formed by layers or thickened portions of the tongues of the spring plate at a distance from the end of the tongue. These designs only require a conventional valve stop wwth a flat impact surface.

The protuberances may be flexible, and may, for example, consist of a flexible material such as rubber or plastics or provided with springs. In this way the damping effect is improved.

Further details of the invention will be apparent from the following description of an embodiment which is illustrated in the drawings. In the drawings.

Figure 1:
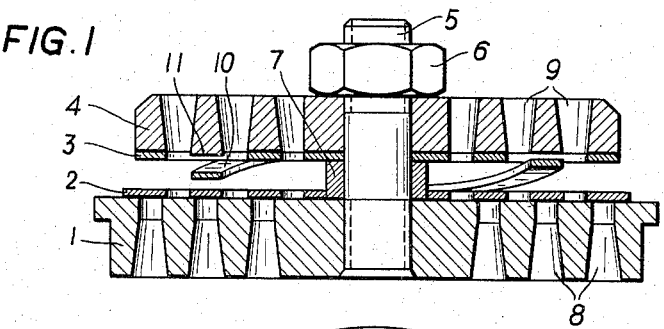
FIG. 1 is an axial centre section through a disc valve according to the invention.

The disc valve shown in FIG. 1 has a seat valve 1, a valve disc or closing member 2, a spring plate 3 and a valve stop 4. The seat valve 1 and the valve stop 4 are connected together by a screw 5 with a nut 6 and are held spaced from each other by a spacer ring 7 on the outer sleeve of which the valve plate slides during the lifting movement. In the valve seat 1 are provided flow ducts 8, the openings of which are closable by the valve disc or closing member 2. The valve stop 4 has flow ducts 9. The spring plate 3 is in its centre clamped between the valve stop 4 and the spacer ring 7 so that it is supported on the valve stop 4 and has outwardly bent spring tongues 10 which press the valve disc 2 onto the valve seat 1.

Figure 2:
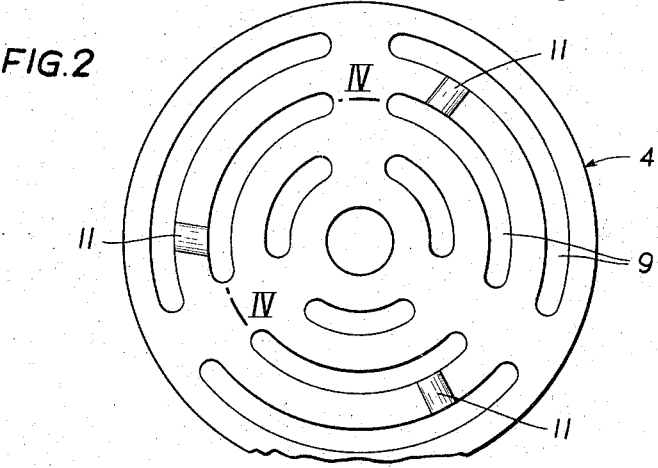
FIG. 2 is a bottom view of the surface of the valve stop.
Figure 3:
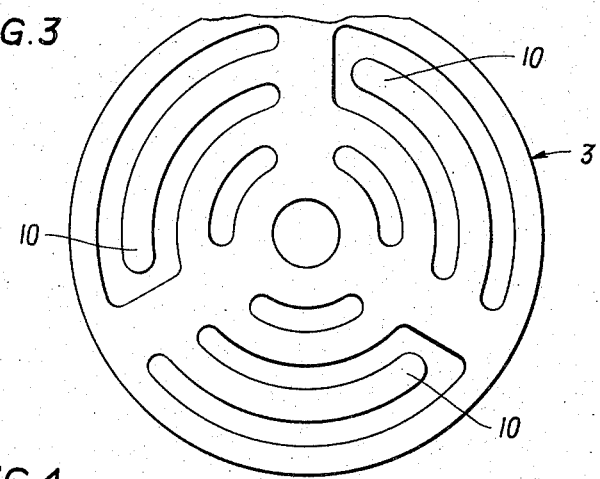
FIG. 3 is a plan view of the spring plate.

Protuberances 11 are provided on the surface of the valve stop 4 supporting the spring plate 3. As is apparent from the view in FIG. 2 of the valve stop 4 in connection with the plan view of the spring plate according to FIG. 3, the protuberances 11 are mounted in the region of the spring tongues 10 near the free ends thereof so that during the opening stroke of the valve the tongues 10 when they are pressed by the valve disc 2 against the valve stop 4 meet the protuberances 11. The free spring length of the tongues 10 is thereby reduced so that they become correspondingly stiffer and absorb the impact of the valve disc 2 on the valve stop 4 or on the spring plate 3 located in front thereof. Furthermore, the protuberances 11 prevent the valve disc 2 from abutting the spring plate 3 over its entire surface whereby an adhesion between the two plates and the disadvantageous late closing of the valve caused thereby are avoided. To achieve these advantages it is sufficient if the protuberances 11 project only a few tenths of a millimetre beyond the support surface of the valve stop 4. The height of the protuberances 11 determines the damping distance whilst the stiffness of the spring tongues 10 after meeting the protuberances 11 is dependent on the distance of the protuberances 11 from the tongue ends. The deisred damping effect can be selected by varying these two parameters, the height of the protuberances 11 and the distance thereof from the free ends of the spring tongues 10 and furthermore, the characteristic of the spring action of the valve can be adapted to meet the most varied requirements.

Figure 4:
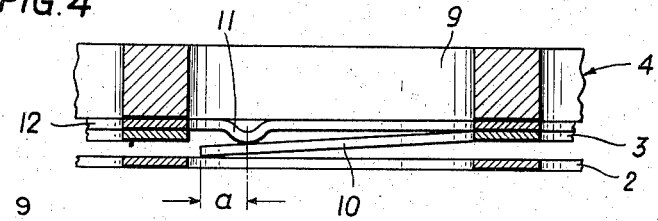
FIG. 4 is a projected sectional view through a part of the valve along the line IV—IV in FIG. 2.

FIG. 4 illustrates a developed variaiton wherein the support surface of the valve stop 4 is flat and a cushion plate 12 in which the protuberances 11 are pressed or stamped is mounted on the surface. The valve disc 2 is shown near the end of its opening stroke, namely in that position in which the spring tongues 10 strike the protuberances 11. The free length of the spring tongues 10 is thereby reduced to the spacing $a$ between the protuberances 11 and the free tongue end. Due to the sudden increase in stiffness of the spring tongues 10, the impact of the valve disc 2 at the end of the stroke is effectively damped. As can furthermore be seen from FIG. 4, the protuberances 11 prevent the valve plate 2 from resting on the spring plate 3 over its entire surface, whereby a delay in the closing movement by an adhesion effect between the plates is prevented.

Figure 5:
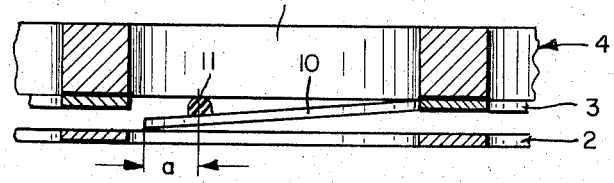
FIG. 5 is a view similar to FIG. 4 showing another embodiment of the invention.

FIG. 5 illustrates another variation wherein protuberance 11 may be made of rubber or plastic material secured in any normal manner to tongue 10. Accordingly, the tongue moves toward valve stop 4 and its protuberance, during upward movement of valve disc 2 and before this disc strikes against spring plate 3, contacts the valve stop earlier than if no such protuberance were provided. As soon as protuberance 11 strikes stop 4, tongue 10 is prevented from further bending upwardly along its length; only the spacing $a$ remains as the free length of the spring tongue.

What is claimed is:

1. A disc or plate valve for piston-type compressors having a valve seat, a valve stop spaced from the valve seat, a closing member mounted for movement between the valve seat and the valve stop, a spring plate mounted between the closing member and the valve stop and having at least one spring tongue bent out of the plane of the spring plate for urging the closing member into sealing engagement with the valve seat, and abutment means disposed between the valve stop and the spring plate, the abutment means being adapted to meet a corresponding spring tongue at a point spaced from the free end of the tongue when the valve is in a partly open position, thereby preventing the spring tongue from being bent back into the plate of the spring plate, and increasing the stiffness of the spring tongue when meeting with the corresponding abutment means.

2. A disc or plate valve as claimed in claim 1 in which the abutment means are in the form of protuberances provided on the surface of the valve stop facing the valve seat.

3. A disc or plate valve as claimed in claim 1 which further includes a cushion plate mounted between the valve stop and the spring plate and wherein the abutment means are in the form of protuberances provided on the surface of the cushion plate facing the valve seat.

4. A disc or plate valve as claimed in claim 1 in which the abutment means are in the form of protuberances provided on the spring tongue at a point spaced from the free end thereof.

5. A disc or plate valve as claimed in claim 1 wherein the abutment means are resilient.

6. A disc or plate valve as claimed in claim 5 wherein the abutment means are of rubber or plastics material.

* * * * *